(12) United States Patent
Maurer et al.

(10) Patent No.: US 10,946,488 B2
(45) Date of Patent: Mar. 16, 2021

(54) FIXTURE AND CLAMPING HOUSING

(71) Applicant: SMW-AUTOBLOK Spannsysteme GmbH, Meckenbeuren (DE)

(72) Inventors: Eckhard Maurer, Oberteuringen (DE); Jürgen Marquart, Markdorf (DE)

(73) Assignee: SMW-AUTOBLOK Spannsysteme GmbH, Meckenbeuren (DE)

( * ) Notice: Subject to any disclaimer, the term of this patent is extended or adjusted under 35 U.S.C. 154(b) by 395 days.

(21) Appl. No.: 15/888,526

(22) Filed: Feb. 5, 2018

(65) Prior Publication Data

US 2018/0229337 A1 Aug. 16, 2018

(30) Foreign Application Priority Data

Feb. 13, 2017 (EP) ..................................... 17155782

(51) Int. Cl.
*B23Q 3/06* (2006.01)
*B23B 31/171* (2006.01)
*B23Q 1/00* (2006.01)

(52) U.S. Cl.
CPC .......... *B23Q 3/069* (2013.01); *B23B 31/1612* (2013.01); *B23Q 1/0072* (2013.01); *B23Q 2703/02* (2013.01); *Y10T 279/17717* (2015.01); *Y10T 279/1926* (2015.01)

(58) Field of Classification Search
CPC .. B23Q 1/0072; B23Q 3/06; B23B 31/16004; B23B 31/1612; Y10T 279/1926; Y10T 279/17717; Y10T 279/17803; Y10T 279/1933; B25B 13/00; B25B 13/10; B25B 13/12; B25B 13/14; B25B 13/18; B25B 13/32; Y10S 279/905

USPC .................................... 279/114, 71, 81, 115
See application file for complete search history.

(56) References Cited

U.S. PATENT DOCUMENTS

| 406,857 | A | * | 7/1889 | Saunders | ................. B23G 5/12 408/176 |
| 1,341,085 | A | | 5/1920 | Tarbutton | |
| 1,533,875 | A | * | 4/1925 | McCleary | ............... E21B 33/06 220/324 |

(Continued)

FOREIGN PATENT DOCUMENTS

| DE | 1120839 | 12/1961 |
| DE | 10 2010 010 898 C5 | 4/2017 |
| EP | 2363225 | 4/2015 |

*Primary Examiner* — Lee D Wilson
*Assistant Examiner* — Mahdi H Nejad
(74) *Attorney, Agent, or Firm* — Pandiscio & Pandiscio, P.C.

(57) ABSTRACT

A fixture to hold a workpiece comprising, among other things, a housing having a passage opening into which a clamping pin is inserted for supporting the workpiece; a driving ring mounted in the housing; and at least two locking pins facing the axis of the opening, mounted radially in the housing so as to be able to move, wherein the clamping pin is locked in the opening of the housing when the locking pins are moved toward the axis, and released from the passage opening of the housing when the locking pins are moved away from axis; wherein, a control surface with at least two different pitches is worked onto an inside of the driving ring, and a contact surface is worked onto an inner wall of the driving ring so as to permit movement of the locking pins by rotation of the driving ring.

15 Claims, 7 Drawing Sheets

(56) References Cited

U.S. PATENT DOCUMENTS

| | | | | |
|---|---|---|---|---|
| 5,192,087 | A * | 3/1993 | Kawashima | B23B 31/1612 |
| | | | | 118/503 |
| 5,531,549 | A * | 7/1996 | Fossella | B23B 31/123 |
| | | | | 279/140 |
| 5,961,261 | A * | 10/1999 | Stark | B23Q 11/005 |
| | | | | 409/219 |
| 6,726,222 | B2 * | 4/2004 | Rohm | B23B 31/1071 |
| | | | | 279/125 |
| 7,648,315 | B2 * | 1/2010 | Omi | B23B 31/1071 |
| | | | | 279/71 |
| 8,991,886 | B2 | 3/2015 | Schuster et al. | |
| 9,283,645 | B2 | 3/2016 | Schraeder et al. | |
| 9,296,110 | B2 | 3/2016 | Drab et al. | |
| 9,656,393 | B2 | 5/2017 | Becker et al. | |
| 2003/0062695 | A1 * | 4/2003 | Lin | B23B 31/22 |
| | | | | 279/71 |
| 2007/0187909 | A1 * | 8/2007 | Troxler | B23Q 1/0072 |
| | | | | 279/76 |
| 2009/0020937 | A1 * | 1/2009 | Odell | B25B 1/2463 |
| | | | | 269/271 |
| 2009/0079142 | A1 * | 3/2009 | Gross | B23Q 1/0072 |
| | | | | 279/2.09 |
| 2013/0093148 | A1 * | 4/2013 | Schraeder | B23Q 3/12 |
| | | | | 279/142 |
| 2013/0181386 | A1 * | 7/2013 | Hofmann | B23Q 3/00 |
| | | | | 269/20 |
| 2015/0061205 | A1 | 3/2015 | Becker | |
| 2015/0343646 | A1 | 12/2015 | Drab et al. | |
| 2016/0082660 | A1 | 3/2016 | Schuster et al. | |
| 2016/0114490 | A1 | 4/2016 | Becker et al. | |
| 2018/0264659 | A1 | 9/2018 | Kirsten et al. | |
| 2018/0290267 | A1 | 10/2018 | Kirsten et al. | |
| 2018/0369974 | A1 * | 12/2018 | Kempter | B23Q 3/12 |

\* cited by examiner

FIXTURE AND CLAMPING HOUSING

REFERENCE TO PENDING PRIOR PATENT APPLICATION

This patent application claims benefit of European Patent Application No. 17 155 782.0, filed Feb. 13, 2017, which patent application is hereby incorporated herein by reference.

FIELD OF THE INVENTION

The present invention relates to a fixture and a clamping housing by means of which a workpiece to be machined is held on a tool table of a machine tool, in accordance with the pre-characterising clauses of patent Claims 1 and 14.

BACKGROUND OF THE INVENTION

EP 2 363 225 B1 discloses what is referred to as a zero point clamping system by means of which a workpiece to be machined can be attached in the area of a machine tool so as to carry out the installation and removal of the workpiece on the machine tool or its tool table without extensive conversion times being required for these procedures. For this purpose, a clamping fixture of this kind possesses a housing into which a passage opening is worked. The internal radius of the passage opening consists of subsections with different sizes which increase in size upwards starting from the tool table, with the effect that the fixture can be locked on the tool table by means of a fastening screw. As a result, the clamping housings are components of the fixture and cannot be exchanged any longer when they are positioned accordingly on the tool table. Rather, the workpiece to be machined should be able to be exchanged quickly and easily on the fixture.

In order to achieve a rapid connection or linkage between the workpiece and the clamping housing of the fixture, the workpiece is connected to a clamping pin in a pre-installation step that is inserted into the passage opening of the housing of the fixture. The clamping pin inserted in this way is secured in the passage opening of the housing by means of three clamping slides or locking pins. The locking pins are mounted in the housing so as to be radially movable, and are moved by means of the driving force of a driving ring which can be rotated by a driving means, such as an actuator piston which can be moved axially. The rotational movements of the driving ring are passed on to the locking pins by means of cams or projections formed onto them, in which case the locking pins have grooves worked into them for accommodating the projections or cams.

It is disadvantageous that projections are provided on the driving ring for the driving connection of each of the locking pins that are present, by means of which a force or shape-locking active connection is established between the driving ring and the corresponding locking pin. Such a design embodiment of the driving ring as well as the driving connection between it and the corresponding locking pin is extremely costly to manufacture and takes a lot of time in assembly, because for one thing the projections must be produced within a very tight tolerance band, while for another the components used consist of several interfaces which entail a significant amount of work in assembly. Moreover, the rotational movements of the driving ring and the radial adjustment of the locking pins are subject to disruptions because misalignments can come about during the rotation of the driving ring and the conversion of its movement into radial advance movements.

Such zero point clamping systems are referred to as such because a large number of workpieces to be machined can be pre-installed on clamping pins. In order for the workpieces to be machined, it is only necessary to measure the first workpiece in relation to the working area of the machine tool; each further workpiece to be machined can then be machined by the machine tool immediately without further measurements because the position of the workpiece in relations to the position of the clamping fixture is known and predefined.

If, however, the driving connection between the driving ring and the inserted locking pin has a corresponding amount of play, this unavoidably leads to the situation in which error tolerances arise during clamping of the clamping pin against the clamping housing of the fixture, which consequently also lead to errors in machining of the workpiece. Accordingly, clamping fixtures of this kind are subject to errors in the predefined clamping position of the workpieces to be machined, and time-consuming remeasurements are thus required, which cause significant costs, in order to ensure that such error tolerances are kept as low as possible.

Furthermore, it is particularly disadvantageous that in the disclosed clamping fixture the rotational movement of the driving ring is converted into a radial movement of the locking pins without a ratio. During the clamping procedure, it is necessary for the clamping pin to be contacted by the locking pins as quickly as possible. This means that the advance movements of the locking pins should be carried out with fast motion so that contact will take place between the locking pins and the clamping pin with as few rotations of the driving spindle or axial advance movements of a piston as possible. In a subsequent clamping stroke, the locking pins should make active contact with the clamping pin in such a way that the clamping pin will be reliably clamped in an orientated position by the locking pins. The disclosed clamping fixture, however, does not have any ratios or gearing arrangements between the driving connection of the driving ring and the locking pins, with the effect that the rotation of the driving ring is converted into a radial advance movement of the locking pins with the same profile or with an equivalent amount.

SUMMARY OF THE INVENTION

It is thus the task of the present invention to develop the configuration of a fixture with a clamping housing of the aforementioned kinds in such a way that, firstly, the conversion of the rotational movement of the driving ring into a radial advance movement for the locking pins that are used should be without play and with at least two different ratios permitting a high-speed and a clamping stroke, while secondly, the production as well as assembly of the driving rings and locking pins should be able to be carried out inexpensively and without additional time requirements.

This task is achieved in accordance with the present invention by the features of the characterising parts of patent Claims 1 and 14, Further advantageous embodiments of the invention can be derived from the subordinate claims.

A control surface or control cam with at least two different pitches is worked onto the inside of the driving ring in each area of the locking pins, an accommodating pocket with a U-shaped cross section is worked into the corresponding locking pins into which the driving ring engages, and a control contour is attached or provided on the contact surface of the locking pin facing the inner wall of the driving ring and the control contour is in contact with the control surface or control cam of the driving ring and rotates the corresponding locking pin radially inwards or outwards depending on the direction of rotation of the driving ring, the effect is achieved that the locking pins can be moved in both a high-speed and a clamping stroke with the result that the clamping pin that carries the workpiece and is inserted in the passage opening of the housing is attached reliably and in an orientated position with a few rotations of the driving spindle.

If a guide groove with a U-shaped cross section is provided in the passage opening into which guide groove the driving ring is inserted and mounted within it in a rotating arrangement, it is guaranteed that the driving ring will be held inwardly and outwardly during the rotational movement, with the effect that misalignment of the driving ring will not occur.

The locking pins are mounted in an orientated position to allow axial or radial movement in the housing and in the wall of the guide groove, as a result of which they are supported on two positions spaced apart from one another so as to achieve a reliable and trouble-free movement.

The U-shaped recess is provided on the corresponding locking pins and the driving ring is inserted into this recess, as a result of which not only the locking pins but also the driving ring are held in the guide groove by means of a cover connected to the housing, and their corresponding movements are released.

In order to achieve centring of the workpiece on the fixture in such a way that each pre-assembled structural unit comprising workpiece and clamping pin will have an identical orientation in relation to the clamping status on the machine tool, one or more centring projections is/are provided or formed on the upper side of the clamping pin and interact with the contact surfaces that are worked onto the workpiece. As a result of this, the workpieces are positioned on the clamping pin in an orientated position and there is no need for repeated measurements of the workpiece with regard to its machining position in relation to the machine tool, because the fixture is connected to the tool table of the machine tool in a fixed location, and it is only necessary to attach the new workpiece with a corresponding clamping pin to the clamping housing of the fixture. Consequently, the fixture in accordance with the present invention provides a zero point clamping system for users.

It is particularly advantageous if a circumferential clamping groove or several individual clamping grooves is/are worked into the clamping pin into which the free end of each of the clamping pins engages in the clamping condition. This is because a clamping surface running at an inclined angle is provided on the free end of the corresponding locking pins which is configured sloping at an upward gradient in relation to the horizontal plane from the outside to the inside; in contrast, the pitch of the clamping groove is aligned with the profile of the clamping surface of the locking pins, which means that it serves as a contact for the clamping surface. As soon as the locking pins engage in the clamping grooves of the clamping pin, the clamping surface forces the locking pin against the contact surface of the guide groove and a tractive force is created vectored in parallel to the longitudinal axis of the passage opening, as a result of which the clamping pin is pulled into the inside of the housing. This results in a zero-play arrangement between the clamping pin and the housing, as a result of which the workpiece to be machined is held in an orientated way in positions which are predefined as identical.

During the high-speed stroke, the locking pins must be moved towards the clamping pin with the highest possible advance speed. Low forces are required for this advance movement of the locking pins. As soon as the locking pins make active contact with the clamping pin, the high-speed stroke gear should be changed over to a clamping stroke gear. The clamping stroke gear is characterised in that the locking pins require a very low advance speed but a high clamping force. To achieve this, the control path and the contact surfaces that interact with it on the locking pins are provided with at least two different pitches. The pitch for the high-speed stroke has a much steeper gradient, for example, a parabolic or sinusoidal contour, whereas the clamping stroke gear has a very flat pitch. The transitional area between the clamping stroke and the high-speed stroke is achieved by means of one or more radii, with the effect that the contact surface of the locking pins slides along the control surface of the driving ring without misalignment when the driving ring is moved in one of the two directions of rotation.

BRIEF DESCRIPTION OF THE DRAWINGS

The drawing shows a fixture and its clamping housing configured in accordance with the present invention, by means of which a workpiece to be machined is held on a tool table of a machine tool, the details of which are explained below. In the drawing.

DETAILED DESCRIPTION OF THE PREFERRED EMBODIMENTS

Figure 1A:
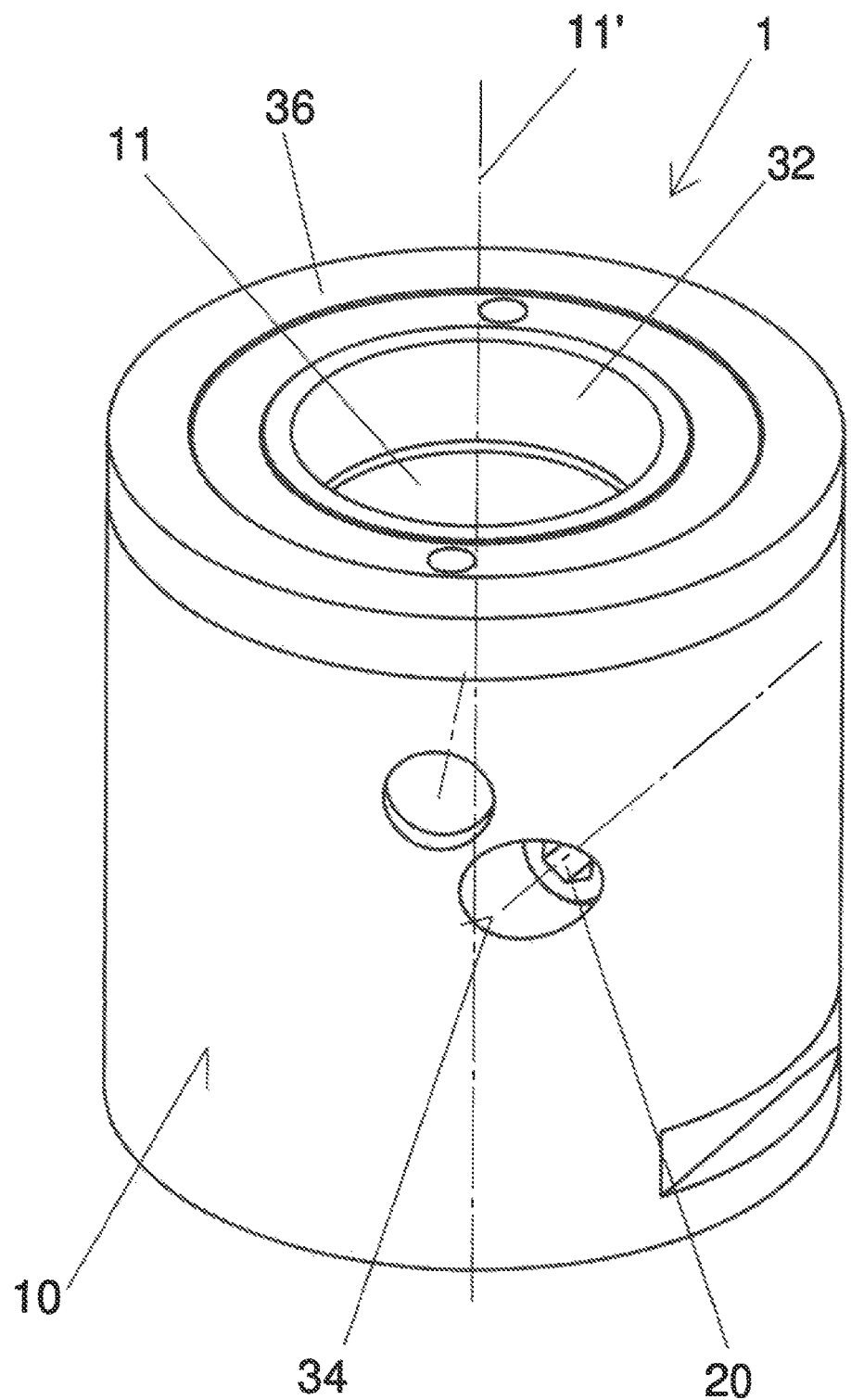
FIG. 1a shows a clamping housing into which a passage opening is worked, as a perspective view.
Figure 1B:
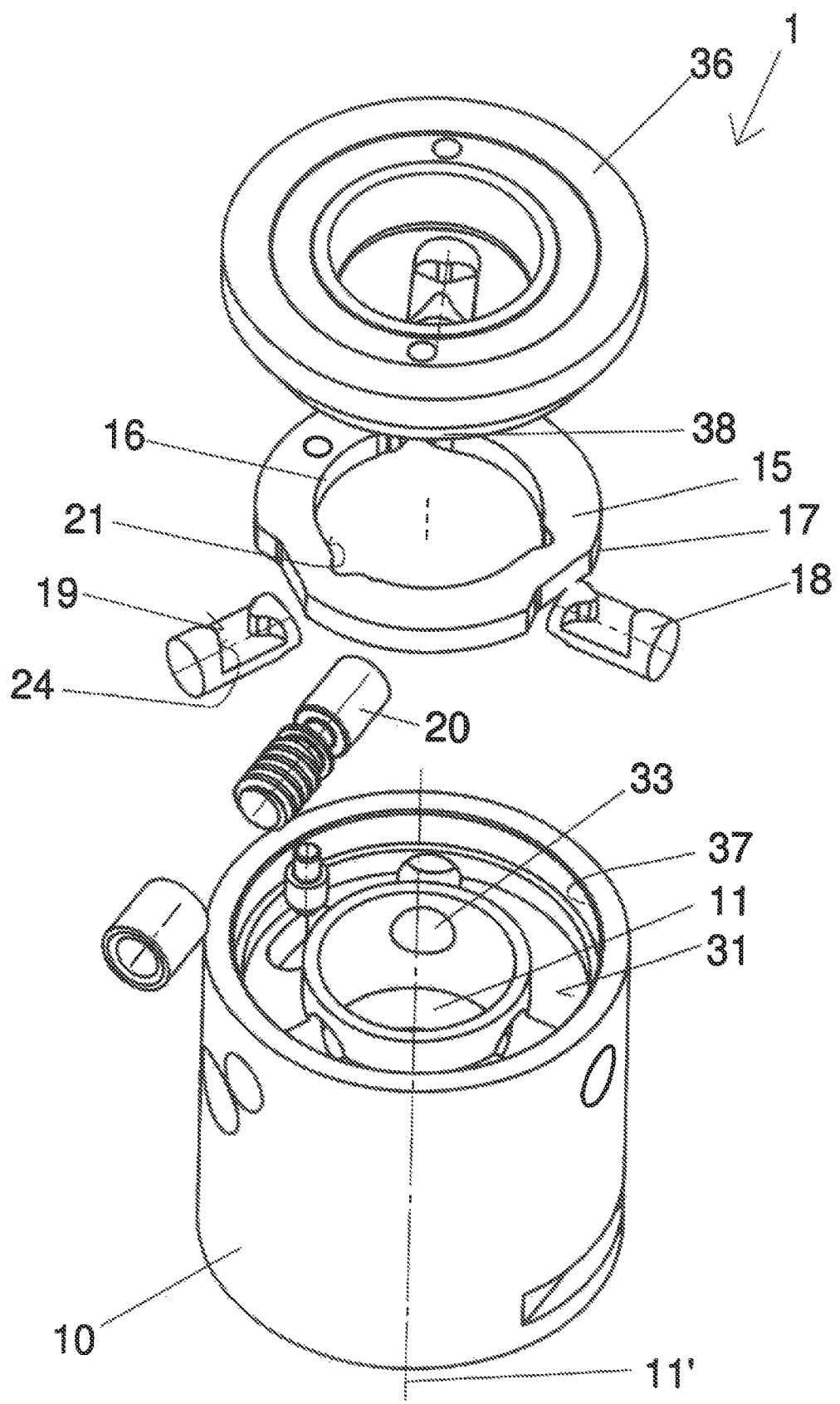
FIG. 1b shows the clamping housing in accordance with FIG. 1a as an exploded view with a driving ring and three locking pins connected to this in a driving arrangement, which are held in the passage opening of the housing in an orientated position by means of a cover.
Figure 2:
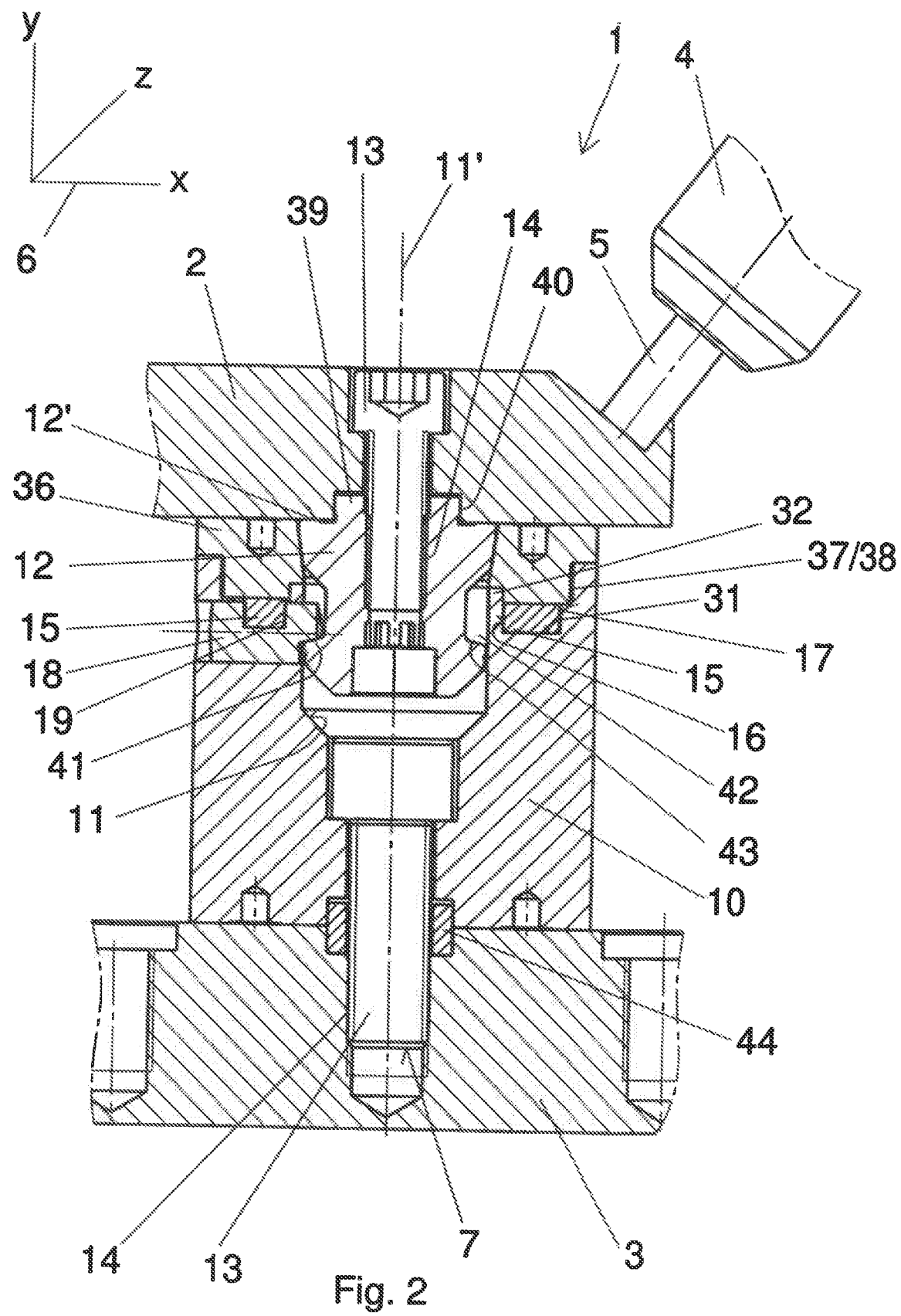
FIG. 2 shows a fixture and the clamping housing in accordance with FIG. 1b as a sectional view which is attached to a tool table of a machine tool by means of a fastening screw and by means of which a workpiece to be machined is supported on the housing by means of a clamping pin.

FIGS. 1a, 1b and 2 show a fixture 1 by means of which a workpiece 2 is attached to a tool table 3 of a machine tool 4 in an exchangeable arrangement. A tool 5 is attached to the machine tool 4 by means of which the workpiece 2 should be machined by the machine tool 4. The clamping fixture 1 in accordance with the present invention has the purpose of avoiding the need to re-establish the position for machining the workpiece 2 on each change of the workpiece 2 on the machine tool 4, because it provides a coupling system explained in more detail below for each workpiece 2 to be machined in an approximately identical position in relation to the machine tool 4 on the tool table 3.

Furthermore, the fixture 1 should provide a quick clamping system by means of which the downtime of the machine tool 4 is kept as short as possible when exchanging the tool 2. The chief feature in this is the fixture 1 which functions as a centring and holding element for the workpiece 2 on the tool table 3 of the machine tool 4.

FIG. 2 in particular shows that the spatial orientation of the workpiece 2 on the tool table 4 is represented using a common X-Y-Z system of coordinates 6. The fixture 1 thus comprises the workpiece 2, the tool table 3 to be connected and a clamping housing 10 assigned to the fixture 1 which has a cylindrical configuration. The housing 10 has a passage opening 11 worked into it, the longitudinal axis of tis is indicated with the reference number 11'. The longitudinal axis 11' and the axis of rotation of the housing 10 are consequently aligned flush with one another. Furthermore, the passage opening 11 has sections of different sizes which increase in the Y-direction of the system of coordinates 6 in relation to the indicated installation situation, meaning that they get larger from the bottom to the top.

In order to attach the housing 10 to the tool table 3, a fastening screw 13 is provided which is inserted into the passage opening 11 and can engage in a thread 14 worked into the tool table 3. In order to hold the housing 10 centred on the tool table 3, a centring sleeve 44 is provided which encompasses the fastening screw 13 and is inserted into corresponding recesses worked into the housing 10 and the tool table 3, which consequently function as centring aids. This means the housing 10 can be locked in an exactly predetermined position on the tool table 3. Moreover, the housing 10 can be permanently attached to the tool table 3 and only the workpiece 2 to be machined is exchanged quickly and in an exact position by means of a corresponding coupling system which is explained in more detail below.

The coupling system for the workpiece 2 chiefly consists of a clamping pin 12 which is attached on the workpiece 2 in a pre-assembly step by means of a further fastening screw 13. The fastening screw 13 consequently passes through the workpiece 2 completely and has engaged in a thread 14 worked into the centre of the clamping pin 12. Consequently, the fastening screw 13 connects the clamping pin 12 to the workpiece 2 and the clamping pin 12 is available as a centring and holding element for connecting to the housing 10 of the fixture, or can be used as such.

A ring-shaped moulding is worked into the workpiece 2 in the area of the clamping pin 12 which interacts with a formed piece or centring projection 39 projecting from the topside 12' of the clamping pin 12. The recess in the workpiece 2 consequently functions as a contact surface 40 in order to attach the workpiece 2 and the clamping pin 12 together in an exactly predetermined orientation. This means the workpiece 2 is held in a known and predetermined position on the tool table 3 by means of the centring sleeve 44 and the centring projection 39 on the clamping pin 12 which engages in the contact surface 40 of the workpiece 2, and the workpiece 2 as well as the clamping pin 12 can be pulled out of the passage opening 11 of the housing 10 or inserted in it as explained in more detail below.

A jacket surface functioning as a further centring aid is formed onto the external periphery of the clamping pin 12, in which case the jacket surface runs immediately adjacent to the workpiece 2 and interacts with the inside of the passage opening 11 with the effect that the clamping pin 12 is supported in a centred arrangement in the passage opening 11.

FIG. 2 shows the attachment of the clamping pin 12 in the passage opening 11. For this purpose, a U-shaped guide groove 31 is worked in at the side adjacent to the passage opening 11 and has a driving ring 15 inserted in it. The driving ring 15 is connected to three locking pins 18 in a driving arrangement. The locking pins 18 are inserted into two passage bores 33 spaced apart flush opposite one another, which are worked on the one hand into a wall 32 of the guide groove 31 and on the other hand into the wall of the housing 10. The locking pins 18 consequently run radially and face towards the longitudinal axis 11' or the passage opening 11. In relation to the Y-axis of the system of coordinates 6, the three locking pins 18 are arranged under the driving ring 15 with the effect that the locking pins 18 are covered by the driving ring 15. To achieve a reliable mounting of the moving components comprising driving ring 15 and locking pins 18, a cover 36 must be provided which has an external thread 38. An internal thread 37 is worked into the side wall of the passage opening 11 and the external thread 38 of the cover can be seen in it. As a result, the cover 36 can be moved towards the tool table 3 by screwing it into the internal thread 37 of the housing 10, as a result of which the driving ring 15 and the three locking pins 18 are held in the guide groove.

Figure 3:
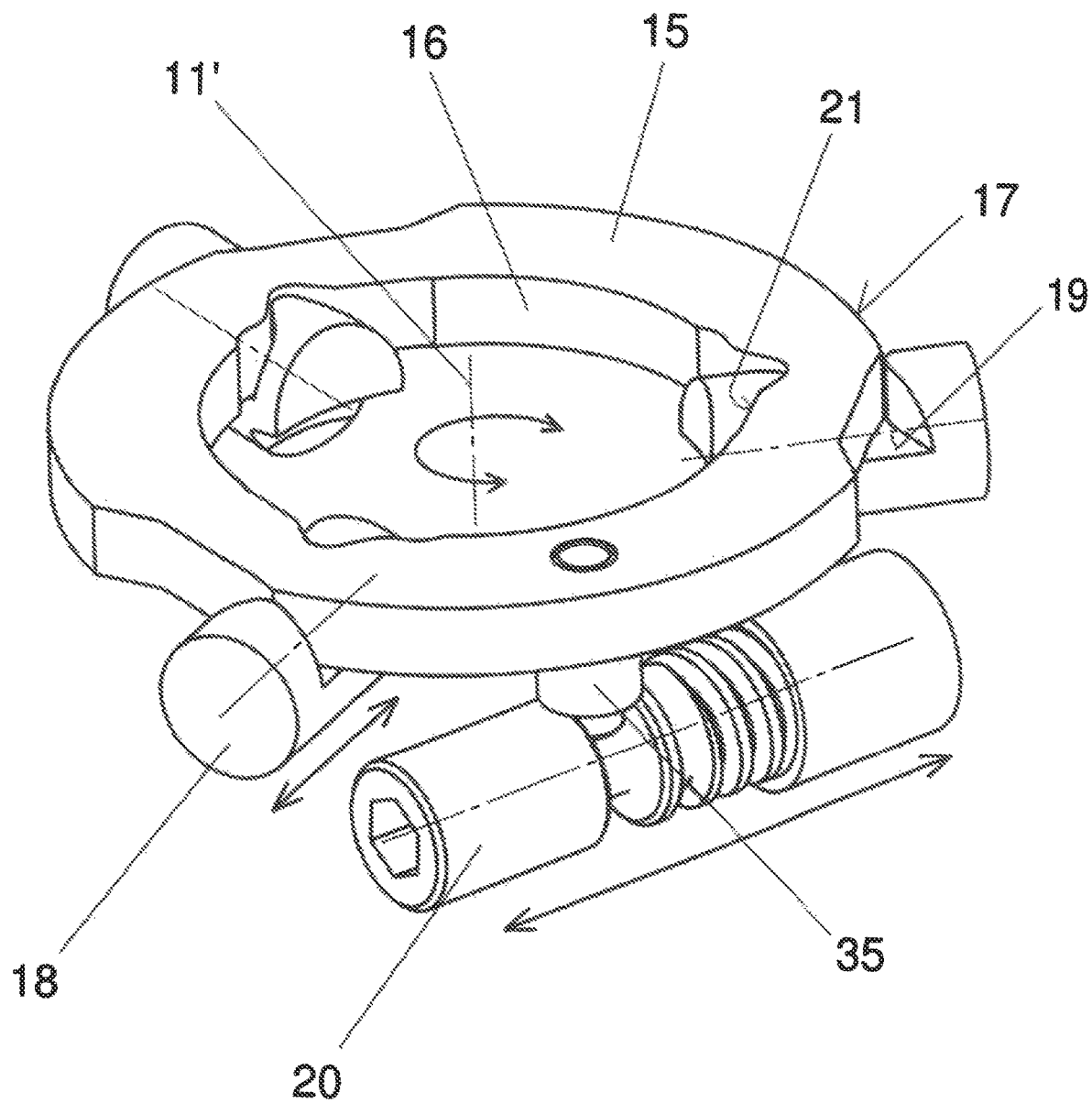
FIG. 3 shows a magnified view of the driving ring with the three locking pins and a driving spindle connected to the driving ring in a driving arrangement, in accordance with FIG. 2.

FIGS. 2 and 3 show that the driving ring 15 is held in the guide groove 31 in such a way as to allow for rotation, because a pin 35 aligned opposite to the Y-axis is formed on the driving ring 15 and is in a driving active connection with a driving spindle 20. The driving spindle 20 is mounted rotatably in a pocket 34 worked into the housing 10, as a result of which the driving spindle 20 creates an advance force during its rotational movement that acts on the driving ring 15. Consequently, the pin 35 is moved in a linear arrangement by means of the thread pitch which is worked into the driving spindle 20, as a result of which the driving ring 15 is caused to rotate about the longitudinal axis 11'.

As a result of the driven connection between the driving ring 15 and the three locking pins 18, the rotation of the driving ring 15 is transferred or converted in each case into a synchronously occurring radial movement of the locking pins 19. Depending on the direction of rotation of the driving ring 15, this means the locking pins 18 move in the direction of the longitudinal axis 11' and thereby reduce the size of the passage opening 11, or the locking pins 18 are pulled out of this opening 11. The clamping pin 12 is arranged in the passage opening 11 and the locking pins 18 are moved in the direction of the clamping pin 12, meaning that the locking pins 18 form a force and shape-locking connection between the locking pins 18 and the clamping pin 12. In order to enable additional tensile forces to be transferred to the clamping pin 12, by means of which the clamping pin 12 and the workpiece 2 should be pressed against the free end face of the housing 10, there is a circumferential clamping groove 42 worked into the clamping pin 12, in which case the clamping groove 42 has a contact surface 43 running at an angle. The contact surface 43 slopes upwards from the outside to the inside and the free face end of each of the locking pins 18 has a clamping surface 41 worked onto it, the pitch of which is adapted to the pitch of the contact surface 43 of the clamping pin 12. Consequently, as soon as the locking pins 18 with their clamping surface 41 come into active contact with the contact surface 43 of the clamping pin 12, this creates a tensile force vectored opposite to the Y-axis of the system of coordinates 6 by means of which the clamping pin 12 and thus the workpiece 2 are pressed into the passage opening 11 or onto the free face end of the housing 10.

FIGS. 3, 4a, 4b and 4c show that each of the locking pins 18 has an accommodating pocket 19 with a U-shaped cross section worked into it. The contour of the accommodating pocket 19 is adapted to the contour of the driving ring 15 or vice versa, with the effect that the driving ring 15 can be inserted into each of the accommodating pockets 19 of the locking pins 18. The inner wall 16 of the driving ring 15 has a two-part control surface 21 with two pitches to enable a high-speed gear and a clamping stroke gear to be generated. The connection between the driving ring 15 and the particular locking pin 18 is a kind of gearing, because a contact surface 25 engages in this control surface 21 in a shape-locking arrangement.

Figure 4A:
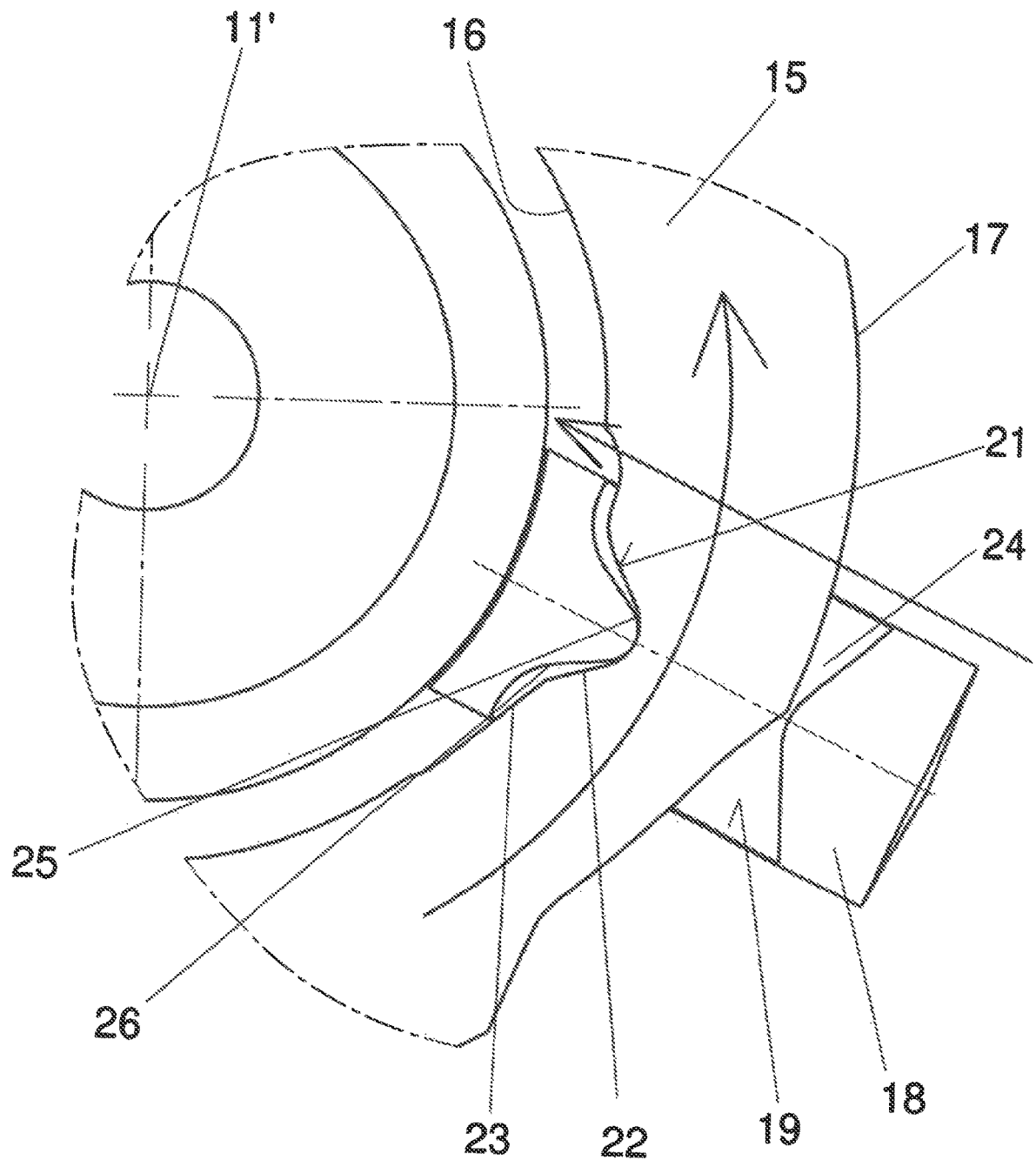
FIG. 4a shows a magnified section between the driving ring and one of the locking pings in accordance with FIG. 3, shown in the initial position, with a control surface provided on the inside of the driving ring and with a contact surface assigned to the locking pin which interacts with the control surface of the driving ring during the rotation of the driving ring and slides along it.

The position of the driving ring 15 and the locking pins 18 shown in FIG. 4a corresponds to the starting position. This means the locking pins 18 completely open the passage opening 11 with the effect that the clamping pin 12 can be inserted into or pulled out of the opening 11. As soon as an actuating force acts via the driving spindle 20 on the driving ring 15, this creates a rotation of the driving ring 15 in the anticlockwise direction. This rotational movement of the driving ring 15 moves each of the locking pins 18 radially into the passage opening 11, with the effect that the locking pins 18 make active contact with the contact surface 43 of the clamping pin 12.

A contact surface 25 is worked into or provided on the side of the accommodating pocket 19 of the locking pins 18 facing toward the inner wall 16 of the driving ring 15 and this contact surface 25 engages in the sinusoidally shaped control surface 21 and is in permanent active contact with it. The control surface 21 has two pitches of different gradients which are defined as the high-speed stroke surface 22 and the clamping stroke surface 23. The high-speed stroke surface 22 is configured with a much greater pitch than the smaller pitch of the clamping stroke surface 23, with the objective of ensuring that each of the locking pins 18 is moved towards the clamping pin 12 or away from it with the fastest possible advance speed. This is because the driving ring 15 is driven at a constant speed of rotation by the driving spindle 20, with the effect that a gear unit with at least two ratios must be provided between the driving ring 15 and the particular locking pin 18. In the high-speed gear created by the high-speed stroke surface 22, the locking pin 18 should be moved as quickly as possible and the advance force should be kept low.

Figure 4B:
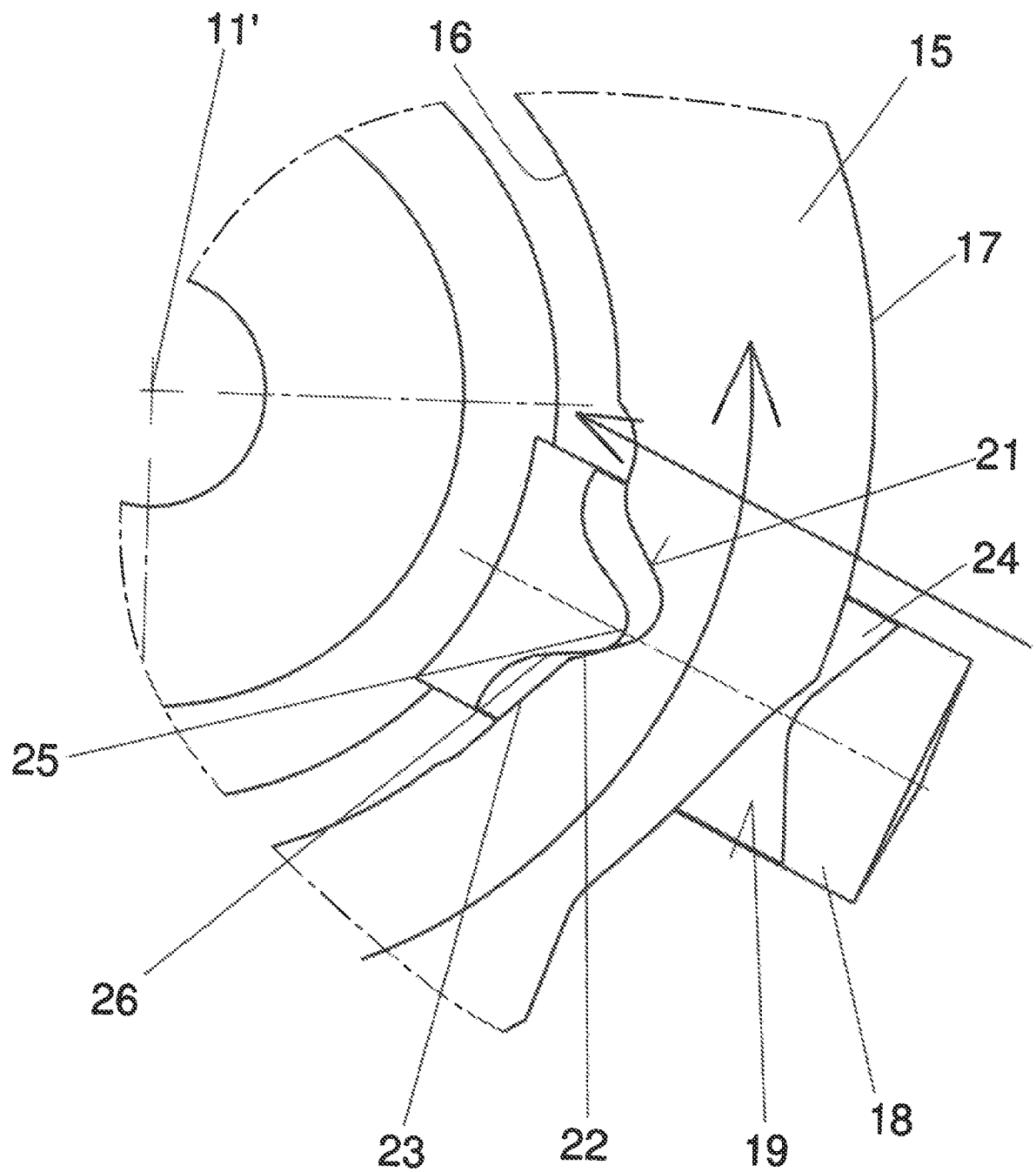
FIG. 4b shows the driving ring and the locking pin in accordance with FIG. 4a during the high-speed stroke and FIG. 4c shows the driving ring and the locking pin in accordance with FIG. 4b during the clamping stroke.

FIG. 4b shows an intermediate position of the locking pin 18 which at this point partially projects into the passage opening 11. The contact surface 25 of the locking pin 18 slides along the control surface 21 in the area which is indicated as the high-speed stroke surface 22.

The rotation of the driving ring 15 in the anticlockwise direction and the subsequent arrangement of the high-speed stroke surface 22 means that an advance force acts on the contact surface 25 and, although the force is small, the large pitch does enable a high advance speed to be reached.

The transition between the high-speed stroke surface 22 and the clamping stroke surface 23 has a specified radius. As a result of the known and prevailing geometrical relationships for clamping the clamping pin 12, the locking pins 18 in this area are moved directly prior to contact with the contact surface 43 of the clamping pin 12. The high-speed stroke of the locking pins 18 should be replaced by the clamping stroke surface 23 from this point onwards.

Figure 4C:
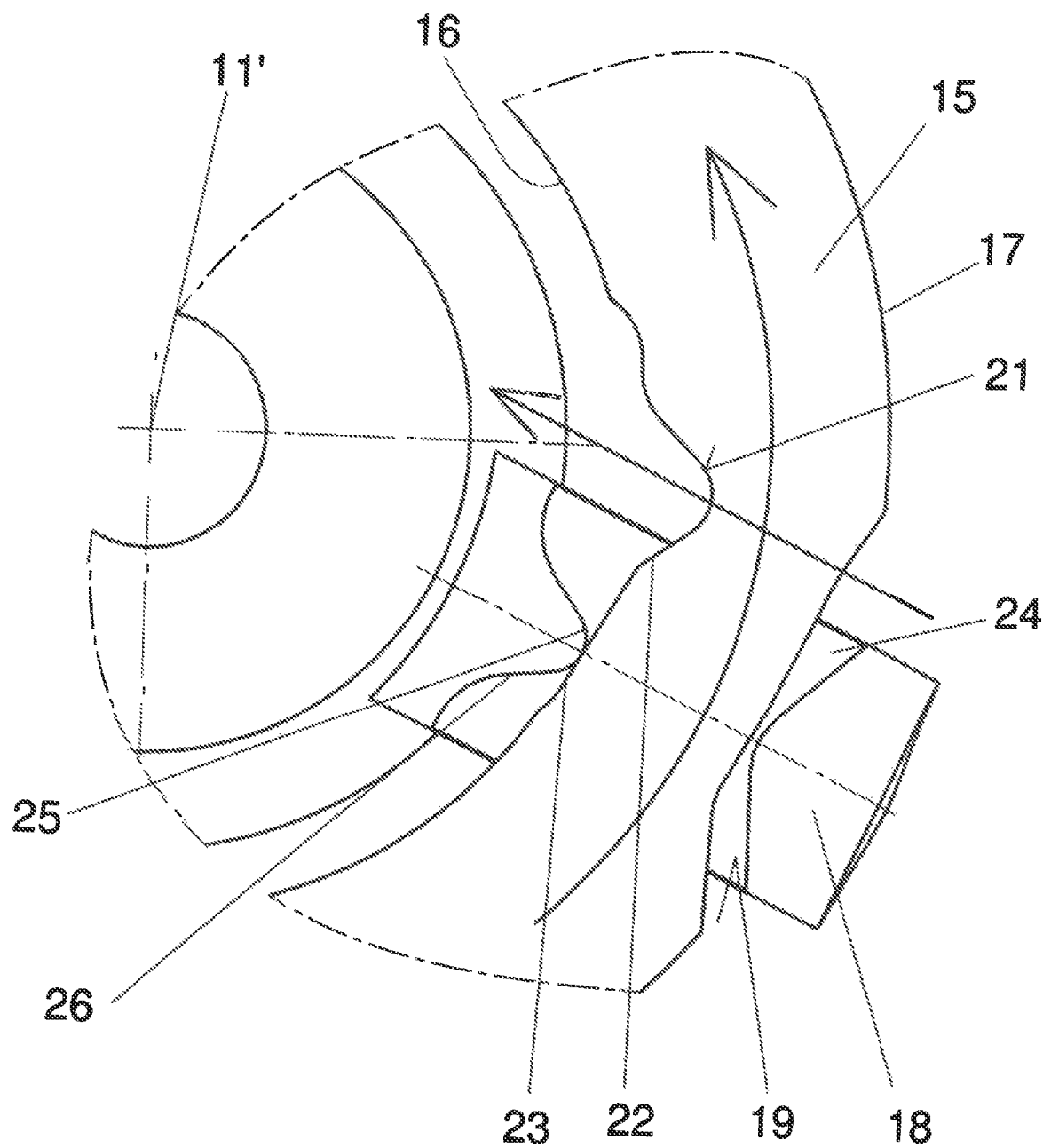

As can be seen in FIG. 4c, the contact surface 25 slides on the clamping stroke surface 23 which has a lower pitch or inclination than the high-speed stroke surface 22. The forward movement of the locking pin 18 should be short; however, a high clamping force is required to bring the locking pin 18 into a reliable active contact with the clamping pin 12.

The wall of the accommodating pocket 19 running opposite to the contact surface 25 is arranged with a clearance 24 in relation to the outer wall 17 of the driving ring 15, with the effect that the rotational movement of the driving ring 15 is released by the clearance 24 and consequently the movement of the driving ring 15 and the locking pins 18 is not prevented.

In each area in which a locking pin 18 is in a driving connection with the driving ring 15, the driving ring 15 consequently has a corresponding control surface 21 provided on the inner wall 16 and a contact surface 25 by means of which a ratio of the constant rotational movement of the driving ring 15 is converted into two radial movements of the locking pin 18, which are namely operated with a high-speed stroke gear and a clamping stroke gear. The high-speed stroke gear is characterised by a fast advance movement with a low force and the clamping stroke gear by a slow or low movement speed with a high force, something which is achieved by the pitches of the two high-speed stroke surfaces 22 and the clamping stroke surface 23.

It is also conceivable for the sequence of the driving ring 15 and locking pins 18 to be reversed in the guide groove 31 with the effect that the cover 36 initially presses the locking pins 18 and then the driving ring 15 into the guide groove 31.

For this purpose, a U-shaped accommodating pocket 19 can be worked into the driving ring 15 and the locking pins 18 are inserted into this pocket 19.

The driving ring 15 is rotated through a limited adjustment angle α by means of the driving spindle 20, in which case the angle α depends on the length of the thread worked into the driving spindle.

Even four to six rotations of the driving spindle 20 are sufficient not only to advance the locking pins 18 but also to grip around the clamping pin 12 and to clamp it.

It is technically possible without further complication to use only two locking pins 18 which are then located flush opposite one another and grip around the clamping pin 12. In order to increase the size of the contact surface between the two locking pins 18 and the clamping pin 12, a formed projection can be provided on the free ends of the locking pins 18 with a ring-shaped or curved configuration. As a result, the formed projection grips around the clamping pin 12, in particular when the latter has a circumferential clamping groove 42 worked into it which can be used by the particular formed projection as a contact or support surface. Consequently, the contact surface between the locking pin 18 and the clamping pin 12 is increased in size by the formed projection and the number of locking pins 18 can be reduced.

When three locking pins 18 are used, they are located at 120° angles in relation to one another. If there is a plurality of locking pins 18, they are arranged evenly distributed about the circumference of the clamping pin 12.

What is claimed is:
1. A fixture to hold a workpiece (2) to be machined on a tool table of a machine tool, the fixture comprising:
 a clamping housing (10) having a passage opening (11) into which a clamping pin (12) is inserted for supporting the workpiece (2) on the clamping housing (10);

a driving ring (15) mounted in the clamping housing (10) in such a way as to be able to rotate, which is in a driving active connection with a driving spindle (20) inserted in the clamping housing (10), by means of which the driving ring (15) can be adjusted about a longitudinal axis (11') of the passage opening (11) within a specified angle range (α); and at least two locking pins (18) facing the longitudinal axis (11') of the passage opening (11), mounted radially in the clamping housing (10) so as to be able to move, and each of which is connected to the driving ring (15) in a driving arrangement, by means of which the clamping pin (12) is locked in the passage opening (11) of the clamping housing (10) when the at least two locking pins (18) are moved radially inboard toward the longitudinal axis (11'), and released from the passage opening (11) of the clamping housing (10) when the at least two locking pins (18) are moved radially outboard away from the longitudinal axis (11');

characterised in that, a control surface (21) or control cam with at least two different pitches (22, 23) is worked onto an inside (16) of the driving ring (15) in each area of the at least two locking pins (18), that an accommodating pocket (19) with a U-shaped cross section is worked into corresponding locking pins of the at least two locking pins (18) into which the driving ring (15) is inserted, and that a contact surface (25) is worked onto or provided on a wall of the corresponding locking pins of the at least two locking pins (18) facing an inner wall (16) of the driving ring (15) and the contact surface (25) is in contact with the control surface (21) or control cam of the driving ring (15) and is configured to move the corresponding locking pins of the at least two locking pins (18) radially inwards or outwards depending on a direction of rotation of the driving ring (15).

2. The fixture in accordance with claim 1, characterised in that, a fastening screw (14) engaging in the passage opening (11) fixes the clamping housing (10) onto the tool table (3) in an oriented position.

3. The fixture in accordance with claim 1, characterised in that, a guide groove (31) with a U-shaped cross section is provided in the passage opening (11) into which the driving ring (15) is inserted and mounted in a rotating arrangement.

4. The fixture in accordance with claim 3, characterised in that, at least two passage bores (33) are worked into the clamping housing (10) and in the wall (32) of the guide groove (31) facing toward the longitudinal axis (11') of the passage opening (11) such that each locking pin of the at least two locking pins is held in a moving arrangement inside a respective passage bore.

5. The fixture in accordance with claim 3, characterised in that, the corresponding locking pins of the at least two locking pins (18) are held in the guide groove (31) by the driving ring (15) and that the driving ring (15) is mounted in the clamping housing (10) by means of a cover (36).

6. The fixture in accordance with claim 5, characterised in that, an internal thread (37) is worked into the clamping housing (10) and an external thread (38) is provided on the cover (36) and that the cover (36) clamps the driving ring (15) in the guide groove (31) when it is screwed into the internal thread (37) of the clamping housing (10).

7. The fixture in accordance with claim 1, characterised in that, the driving spindle (20) is positioned in a rotating arrangement in a pocket (34) worked into the clamping housing (10), that a peg (35) running parallel to the longitudinal axis (11') of the passage opening (10) is formed on or attached to the driving ring (15) and is linked to the driving spindle (20) in a driving connection, and that a rotation of the driving spindle (20) means the driving ring (15) can be rotated about the longitudinal axis (11') of the passage opening.

8. The fixture in accordance with claim 1, characterised in that, each locking pin of the at least two locking pins (18) has an angled clamping surface (41), that a circumferential clamping groove (42) or several individual clamping grooves (42) is/are worked into the clamping pin (12) and the circumferential clamping groove or the several individual clamping grooves (42) have a contact surface (43) sloping downwards and outwards, and that the corresponding clamping surface (41) of the locking pins (18) make contact with the contact surface (42) of the clamping pin (12) when in a clamped condition and jointly with this create a tensile force by means of which the clamping pin (12) is held parallel with the longitudinal axis (11') of the passage opening (11).

9. The fixture in accordance with claim 1, characterised in that, a ring-shaped or polygonal centring projection (39) is provided on a surface (12') of the clamping pin (12) facing the workpiece (2) and the projection (39) interacts with a contact surface (40) worked into the workpiece (2) for aligning the workpiece (2) in relation to the longitudinal axis (11') of the clamping housing (10).

10. The fixture in accordance with claim 1, characterised in that, a centring sleeve (44) is provided between the clamping housing (10) and the tool table (3) by means of which a fastening screw (13) between the clamping housing (10) and the tool table (3) is aligned flush with the longitudinal axis (11') of the passage opening (11).

11. The fixture in accordance with claim 1, characterised in that, the control path or control surface (21) of the driving ring (15) has a contour facing into the inside of the driving ring (15) and that the contour of the control surface or control cam is configured as linear in the area of the inner wall (16) of the driving ring, and that the contact surface (25) of the corresponding locking pins of the at least two locking pins (18) is adapted to the contour of the control cam or control surface (21) and is in active contact with it.

12. The fixture in accordance with claim 1, characterised in that, a cavity (24) is provided between an outer wall (17) of the driving ring (15) and a side wall of the U-shaped accommodating pocket (19) of the corresponding locking pins of the at least two locking pins (18) which runs adjacent to the outer wall (17), by means of which the rotational movement of the driving ring (15) is released.

13. The fixture in accordance with claim 1, characterised in that, a bowed or curved formed projection is provided on at least one of the locking pins (18) which is in active contact with the clamping pin (12) and grips around the latter, at least in some areas, and that the formed projection locks the clamping pin (12) in the passage opening (11).

14. The fixture in accordance with claim 1, characterised in that, two of the at least two locking pins (18) used are located flush opposite one another or that three of the locking pins (18) run at an angle of 120° in relation to one another or that in each further increase in locking pins (18), they are located evenly distributed about a circumference of the locking pin (12).

15. The fixture in accordance with claim 1, characterised in that, the control surface (21, 22, 23) of the driving ring (15) facing away from the longitudinal axis (11') has an outward curvature, and that the contact surface (25) of corresponding locking pins of the at least two locking pins (18) projects into the control surface (21, 22, 23) and that the control surface (21, 22, 23) transfers an advance force from the driving ring (15) onto the corresponding locking pin (18) via the contact surface (25).

\* \* \* \* \*